(12) United States Patent
Ellerbrock et al.

(10) Patent No.: US 9,904,556 B1
(45) Date of Patent: Feb. 27, 2018

(54) EXECUTING A BOOT SEQUENCE INCLUDING MOVEMENT OF DATA THROUGH A BUFFER MEMORY

(71) Applicant: The Boeing Company, Chicago, IL (US)

(72) Inventors: Philip J. Ellerbrock, Cottleville, MO (US); Robert N. Zettwoch, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 1197 days.

(21) Appl. No.: 13/834,999

(22) Filed: Mar. 15, 2013

(51) Int. Cl.
G06F 9/44 (2006.01)
G06F 11/14 (2006.01)
G06F 11/10 (2006.01)
G06F 12/08 (2016.01)
G06F 12/0868 (2016.01)

(52) U.S. Cl.
CPC ........ *G06F 9/4416* (2013.01); *G06F 11/1064* (2013.01); *G06F 11/1441* (2013.01); *G06F 12/0868* (2013.01); *G06F 2212/1032* (2013.01); *G06F 2212/312* (2013.01)

(58) Field of Classification Search
CPC .............. G06F 9/4403; G06F 11/1064; G06F 11/1441; G06F 12/0868; G06F 2212/1032; G06F 2212/312; H04L 12/40032
See application file for complete search history.

(56) References Cited

U.S. PATENT DOCUMENTS

| | | | |
|---|---|---|---|
| 6,708,239 B1 | 3/2004 | Ellerbrock et al. | |
| 6,757,838 B1 * | 6/2004 | Chaiken ................ | G06F 9/4403 714/15 |
| 6,938,106 B2 | 8/2005 | Ellerbrock et al. | |
| 7,082,485 B2 | 7/2006 | Ellerbrock et al. | |

(Continued)

OTHER PUBLICATIONS

Hu, J., Xue, C., Tseng, W., He, Y., Qiu, M., and Sha, E., "Reducing Write Activities on Non-volatile Memories in Embedded CMPs via Data Migration and Recomputation." In DAC '10, Jun. 13-18, 2010, Anaheim, California, USA 2010, pp. 350-355, Copyright 2010.

(Continued)

*Primary Examiner* — Terrell Johnson
(74) *Attorney, Agent, or Firm* — Womble Bond Dickinson (US) LLP (57) ABSTRACT

An apparatus is provided that includes a device interface including port(s) coupled to and defining respective data channel(s) for respective peripheral(s). The device interface also includes boot control logic and a volatile buffer memory, and a volatile configuration memory. The apparatus also includes a non-volatile device storage memory including a contiguous memory block configured to store boot code with a boot set including a configuration routine. The boot control logic is configured to execute boot code including the boot set at power up or reset of the apparatus. The boot set includes a read of data from the device storage memory to the buffer memory, and a write of the data from the buffer memory to configuration memory to initialize the apparatus or a port, with the data being read from a portion of the device storage memory outside the contiguous memory block configured to store the boot code.

20 Claims, 6 Drawing Sheets

(56) References Cited

U.S. PATENT DOCUMENTS

| | | | |
|---|---|---|---|
| 7,096,285 B2 | 8/2006 | Ellerbrock et al. | |
| 7,111,100 B2 | 9/2006 | Ellerbrock et al. | |
| 7,174,402 B2 | 2/2007 | Ellerbrock et al. | |
| 7,206,914 B1* | 4/2007 | Wisor | G06F 9/4403 |
| | | | 711/103 |
| 7,277,970 B2 | 10/2007 | Ellerbrock et al. | |
| 7,301,822 B1 | 11/2007 | Walstrum, Jr. et al. | |
| 7,346,719 B2 | 3/2008 | Ellerbrock et al. | |
| 7,552,256 B2 | 6/2009 | Ellerbrock et al. | |
| 7,581,031 B2 | 8/2009 | Konz et al. | |
| 7,630,431 B2 | 12/2009 | Konz et al. | |
| 7,894,562 B2 | 2/2011 | Konz | |
| 2002/0112070 A1 | 8/2002 | Ellerbrock et al. | |
| 2005/0108500 A1* | 5/2005 | Kishida | G06F 9/4403 |
| | | | 711/218 |
| 2006/0080672 A1* | 4/2006 | Smith | G06F 1/3209 |
| | | | 719/317 |
| 2007/0121631 A1 | 5/2007 | Krikorian et al. | |
| 2008/0172506 A1* | 7/2008 | Ellerbrock | H04L 12/40032 |
| | | | 710/104 |
| 2008/0215834 A1* | 9/2008 | Dumitru | G06F 3/0613 |
| | | | 711/161 |
| 2008/0215870 A1* | 9/2008 | Liew | G06F 9/4403 |
| | | | 713/2 |
| 2011/0161552 A1* | 6/2011 | Lund | G06F 12/0246 |
| | | | 711/103 |
| 2012/0173595 A1* | 7/2012 | Salters | G06F 17/30227 |
| | | | 707/822 |
| 2013/0254457 A1* | 9/2013 | Mukker | G06F 11/1441 |
| | | | 711/103 |

OTHER PUBLICATIONS

European Search Report dated Oct. 16, 2014 for European Application No. 14 158 430.0, 15 pages.
Anonymous: "Sequential access memory—Wikipedia, the free encyclopedia," Wikipedia , URL:http://en.wikipedia.org/w/index.php?title=Sequential_access_memory&oldid=541502912 (accessed as of Nov. 13, 2014).
European Examination Report dated Jul. 21, 2017 for Application No. 14158430.0.

* cited by examiner

EXECUTING A BOOT SEQUENCE INCLUDING MOVEMENT OF DATA THROUGH A BUFFER MEMORY

TECHNOLOGICAL FIELD

The present disclosure relates generally to network communication and, in particular, to executing a boot sequence including movement of data through a buffer memory.

BACKGROUND

A number of applications such as aerospace, automotive and industrial control utilize network systems such as multimedia entertainment, communications, process control and diagnostic systems. As these systems become more complex, a need arises for additional devices to communicate with one another or a central controller or the like. Network systems have been developed to provide a common communications path between network devices. In aerospace and automotive applications, for example, a network system may be utilized to monitor various components and to collect diagnostic and status information such as that relating to the strain, acceleration, pressure and/or temperature. In another example, a network system may be utilized to support communications and the delivery of multimedia information to occupants in an aerospace or automotive application, or for use in process control applications that could be applied to a system such as a vehicle.

Many traditional systems have long analog wiring that may be susceptible to undesirable noise and signal degradation. Even current networked systems developed to shorten the analog wiring still use complicated protocols requiring high-level processors that limit miniaturization and thus limit device locations which can still result in long analog wiring. Further, high-level protocols may introduce overhead into the messages on a bus that may severely limit the number of data samples that can be transmitted on the bus, the latency at which data can be transmitted or delivered, or the time-determinism of the data sampling and delivery. These networks also generally do not support acquisition and control, and they typically only support networks that extend over relatively short lengths. Further, these networks typically have bulky network device interfaces, slow network data rates and/or a low network device count. Additionally, many computer systems that include digital networks do not operate in a time-deterministic manner, and as such, lack the capability to schedule a trigger command to the network components that repeats or is interpreted and executed with any precision timing.

A protocol and digital network structure have been developed to address a number of shortcomings of conventional digital networks. This protocol and digital network structure are described, for example, in U.S. Pat. No. 6,708,239, entitled: Network Device Interface for Digitally Interfacing Data Channels to a Controller via a Network, issued on Mar. 16, 2004, and U.S. Patent Application Publication No. 2002/0112070, entitled: Bus Controller for Digitally Controlling Remote Devices via a Common Bus, published on Aug. 15, 2002, the contents of both of which are incorporated herein by reference. Although this protocol and network structure offers many advantages over many conventional digital networks, it is typically desirable to make further improvements.

BRIEF SUMMARY

Example implementations of the present disclosure are generally directed to an apparatus and method for executing a boot sequence including movement of data through a buffer memory. According to one aspect of example implementations, an apparatus is provided that includes a device interface including one or more ports coupled to and defining respective one or more data channels for respective one or more peripherals. The device interface also includes boot control logic and a volatile buffer memory, and includes a volatile configuration memory. The apparatus also includes a non-volatile device storage memory coupled to the device interface and including a contiguous memory block configured to store boot code with a boot set including a configuration routine for the apparatus or a data channel.

According to this aspect, the boot control logic is configured to execute boot code including the boot set at power up or reset of the apparatus. The boot set includes a read of data from the device storage memory to the buffer memory, with the data being read from a portion of the device storage memory outside the contiguous memory block configured to store the boot code. And the boot set includes a write of the data from the buffer memory to configuration memory to initialize the apparatus or the port for the respective data channel.

In one example, the configuration memory includes volatile configuration memory for each channel, and the boot set includes a configuration routine for a data channel. In this example, the boot set may include a read of data from the device storage memory to the buffer memory, and a write of the data from the buffer memory to the configuration memory to initialize the port for the respective data channel.

In one example, the configuration memory includes volatile device-configuration memory for the apparatus, and the boot set includes a configuration routine for the apparatus. In this example, the boot set may include a read of data from the device storage memory to the buffer memory, and a write of the data from the buffer memory to the device-configuration memory to initialize the apparatus.

In one example, the boot set includes first and second boot sets including configuration routines for respective first and second data channels. In this example, the device interface may include volatile configuration memory for each of the first and second data channels, and the boot control logic may be configured to execute boot code including the first and second boot sets at power up or reset of the apparatus. Also in this example, the first boot set may include a read of data for the first data channel from the device storage memory to the buffer memory, and the second boot set may include a write of the data from the buffer memory to configuration memory for the second data channel.

In various examples, the boot code includes a boot sequence with a plurality of sequential boot sets for respective channels, with the boot sets being in or out of order relative to an order of the respective channels. In one example, the boot sequence includes more than one boot set for at least one channel.

In one example, the boot set includes a configuration routine for a plurality of data channels, the device interface including volatile configuration memory for each data channel. In this example, the boot set may include a read of data from the device storage memory to the buffer memory, and a write of the data from the buffer memory to configuration memory for each of the plurality of data channels to initialize the ports for the respective data channels.

In one example, the read and write are effectuated by consecutively-executed read and write commands in the boot set. In a further example, each of the read and write command words may be followed by a respective delay word in the boot set, with the delay word specifying a number of cycles to delay before execution of a next word sequentially in the boot set.

In a further example, the volatile configuration memory includes channel-based memory for each channel, and the non-volatile device storage memory is device-based memory. In this further example, the read and write commands may be from a communication protocol with which the apparatus is compatible. The communication protocol may include different, distinct sets of commands for accessing respective ones of the channel-based memory and device-based memory, with the sets of commands having different timing requirements. Also in this further example, one of the sets of commands may include the read command, and the other of the sets of commands may include the write command.

In other aspects of example implementations, a method is provided for executing a boot sequence including movement of data through a buffer memory. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. According to example implementations of the present disclosure, the terms "data," "content," "information" and similar terms may be used interchangeably to refer to data capable of being transmitted, received, operated on, interpreted, stored or the like. Like reference numerals refer to like elements throughout.

At the outset, it is notable that example implementations of the present disclosure may be implemented in any type of network system. The network system may be resident in an aircraft, spacecraft, vehicle, building, factory, or any other packages, structures or environment. As examples, the systems, network devices and methods may be implemented in a network system resident on a rotary-wing aircraft, in which the network includes network devices such as a bus controller and one or more remote devices connected to a common network bus. Each of the remote devices may include or be otherwise coupled to one or more peripherals such as transducers (e.g., sensors, actuators), subsystems or the like, configured to communicate with the bus controller via the common network bus such as to determine performance, status or the like, concerning the various components of the aircraft. The transducers may include, for example, sensors for monitoring strain, acceleration, and pressure of the aircraft's main rotor system.

Example implementations of the present disclosure may also be implemented in a network system in a vehicle such as an automobile in which the network system includes peripherals connected to different components of the vehicle. For example, the peripherals may include sensors for monitoring the throttle position, the oil pressure, the water temperature, the transmission fluid pressure, the seat position, the antilock brake system, the suspension, the passive restraint system and the steering system, to name but a few. In other examples, the peripherals may include an actuator for performing a particular function in response to a command from the bus controller. In the automotive application, for example, the peripherals may include actuators for controlling the throttle position, the anti-lock brake system, the suspension, the passive restraint system and the active suspension system, to name but a few.

Still further, the peripherals may include an audio or video source. For example, the peripherals may include radio receivers, tape cassette players, CD players, MP3 players, cellular telephone receivers or other audio sources for providing audio signals, including, in some instances, streaming audio signals, to the network bus. Correspondingly, the peripherals may include speakers, headphone jacks or the like for receiving audio signals from the network bus and for providing a corresponding audible output. Similarly, peripherals may include a television receiver, a video cassette player, DVD player or other video source for providing video signals, including streaming video signals, to the network bus. Accordingly, peripherals may include a video monitor or the like for receiving the video signals and for displaying images based upon the video signals.

It is also understood that example implementations of the present disclosure may be based on any particular protocol and network structure. In one example, the systems, network devices and methods may be based on the protocol and network structure described in the aforementioned '239 patent and '070 publication. Other related references include U.S. Pat. Nos. 6,938,106; 7,082,485; 7,096,285; 7,111,100; 7,174,402; 7,277,970; 7,346,719; 7,552,256; 7,581,031; 7,630,431 and 7,894,562, the contents of all of which are incorporated by reference.

The aforementioned protocol and network structure may offer many advantages over many conventional digital networks. As explained in the background section, many prior digital networks operate according to complicated protocols that require each network device to have a relatively high-level processor. This, in turn, may increase the cost of the network devices. Further, the high-level protocol may introduce overhead into the messages on the bus that may severely limit the number of data samples that can be transmitted on the bus. These networks also generally do not support both acquisition and control, and they typically only support networks that extend over relatively short lengths. Further, these networks typically have bulky network device interfaces, slow network data rates and/or a low network device count. Additionally, many computer systems that include digital networks do not operate in a time-deterministic manner, and as such, lack the capability to schedule a trigger command to the network components that repeats or is interpreted and executed with any precision timing.

In light of these shortcomings, the digital network structure and protocol of the aforementioned '239 patent and '070 publication use a low-level instruction set allowing less complicated devices to be implemented. The network structure and protocol may also allow for increased data rates and use a command structure that allows for precision timing data acquisition or other actions on the network bus.

Although example implementations of the present disclosure may be based on a variety of network architectures, the functions of example implementations may be added to the existing command structure of the foregoing network structure and protocol. That is, various examples of the present disclosure may be based on the digital network structure and protocol of the '239 patent and '070 publication. Specifically, the commands described below may be implemented with the same or similar structure as those of the protocol, and the communication structure may be the same or similar.

Figure 1:
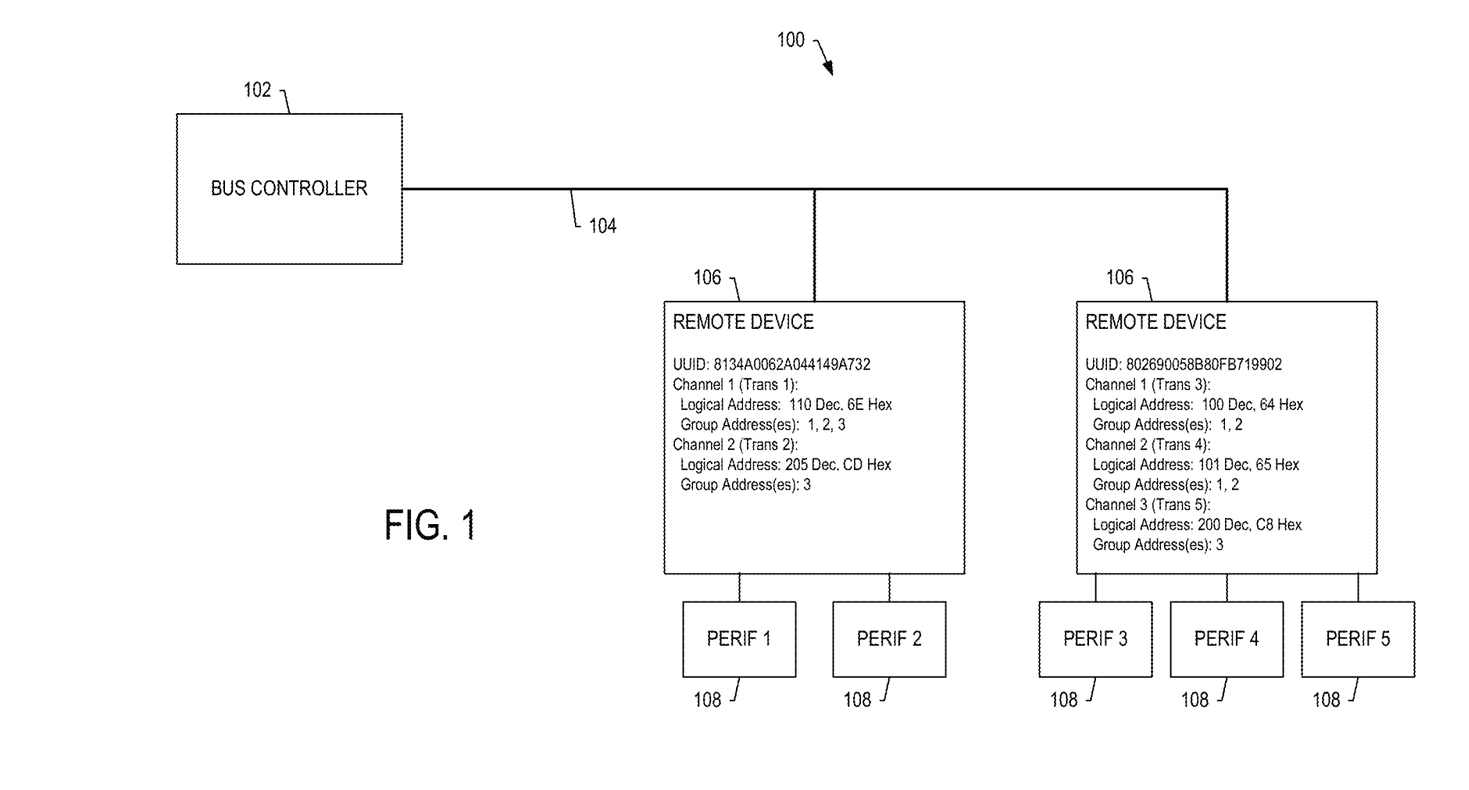
FIG. 1 illustrates a generalized network system in which example implementations of the present disclosure may be implemented.

With reference to FIG. 1, a generalized network system in which example implementations of the present disclosure may be implemented is illustrated. Specifically, FIG. 1 illustrates a network system 100 having a host computer or bus controller 102, a network bus 104, and one or more remote devices 106 (two shown for example) each of which may include or be otherwise coupled to one or more peripherals 108 such as sensors, actuators or the like (five shown for example). In this configuration, the bus controller may provide configuration and control of the network system. The individual remote devices may include assigned identifiers or addresses that uniquely define the remote devices on the bus. In one example, each remote device may include one or more data channels for its respective one or more peripherals, and each data channel may be separately addressed to permit separate communication via each data channel.

In operation, the bus controller 102 may send commands addressed to one or more remote devices 106 via the network bus 104. The remote device(s) designated by the respective address(es) or their peripheral(s) may perform actions associated with the command, and may respond by placing data on the network bus to be sent to either the bus controller or one or more other remote devices. Additionally or alternatively, for example, the remote device(s) may respond to a command, such as a trigger command, by initiating an incoming data measurement in a peripheral such as a sensor, or move a value to an output in a peripheral such as an actuator.

In some examples, a remote device may 106 may provide signal conditioning and may include a built-in device interface for interfacing peripherals with the bus controller 102. In some examples, the device interface (sometimes referred to as a network device interface—NDI) may be used with peripherals that cannot otherwise directly communicate with the bus controller. The device interface may receive and interpret commands from the bus controller and control signal conditioning, such as receiving data from sensors or activating actuators, based on the commands and data from the bus controller.

As suggested above, in various examples, the network system 100 may operate in conjunction with a data protocol that uses a low-level instruction set allowing less-complicated network devices such as the bus controller 102 and/or remote devices 106. This may allow the controller to communicate with one or more remote devices at a time across the network bus 104. Due to the simplicity of the protocol, a network device may not require a high-level processor. Instead, in various examples, the network device may include a hardware-based state machine, which may be implemented as a low-level processor such as an application-specific integrated circuit (ASIC), field-programmable gate array (FPGA) or the like. By using a state machine instead of a micro-controller or processor in various examples, example implementations may permit the simultaneous performance of many processes, which may aid time-deterministic and fast performance of the network device.

Because the bus controller 102 may connect to the remote devices 106 via a common network bus 104, the bus controller may not require dedicated connections to each remote device or their peripherals to control the network system 100. The bus controller may instead use an addressing scheme to assign and control the remote devices and their peripherals. To operate the network system, each remote device or each channel of a remote device may be assigned one or more addresses, including one or more logical addresses, global addresses and/or group addresses. In various examples, one or more of these logical, group and/or global address(es) may be determined according to a process that uses a Universal Unique Identifier (UUID) associated with each remote device. The UUID code is an 80-bit code that is unique to each remote device, and is based on the location and date the device was manufactured. For an example of one such method, see the aforementioned '070 publication.

A logical address may be recognized by a single remote device 106, or a single data channel of a remote device, which the bus controller 102 may use to direct a command (or request) to a particular network device/channel. A global address, on the other hand, may be recognized by all of the remote devices, which the bus controller may use to exchange universal data and commands such as to universally initialize or reset all of the remote devices. A group address may be recognized by a particular group of remote devices on the network which the bus controller may use to exchange group data and commands. For example, the group address scheme may permit the bus controller to set up time-deterministic triggers for groups of remote devices at various sample rates. In another example, the group address scheme may permit groups of remote devices to establish peer-to-peer communications on the network bus 104 without interdiction from the bus controller.

Figure 2:
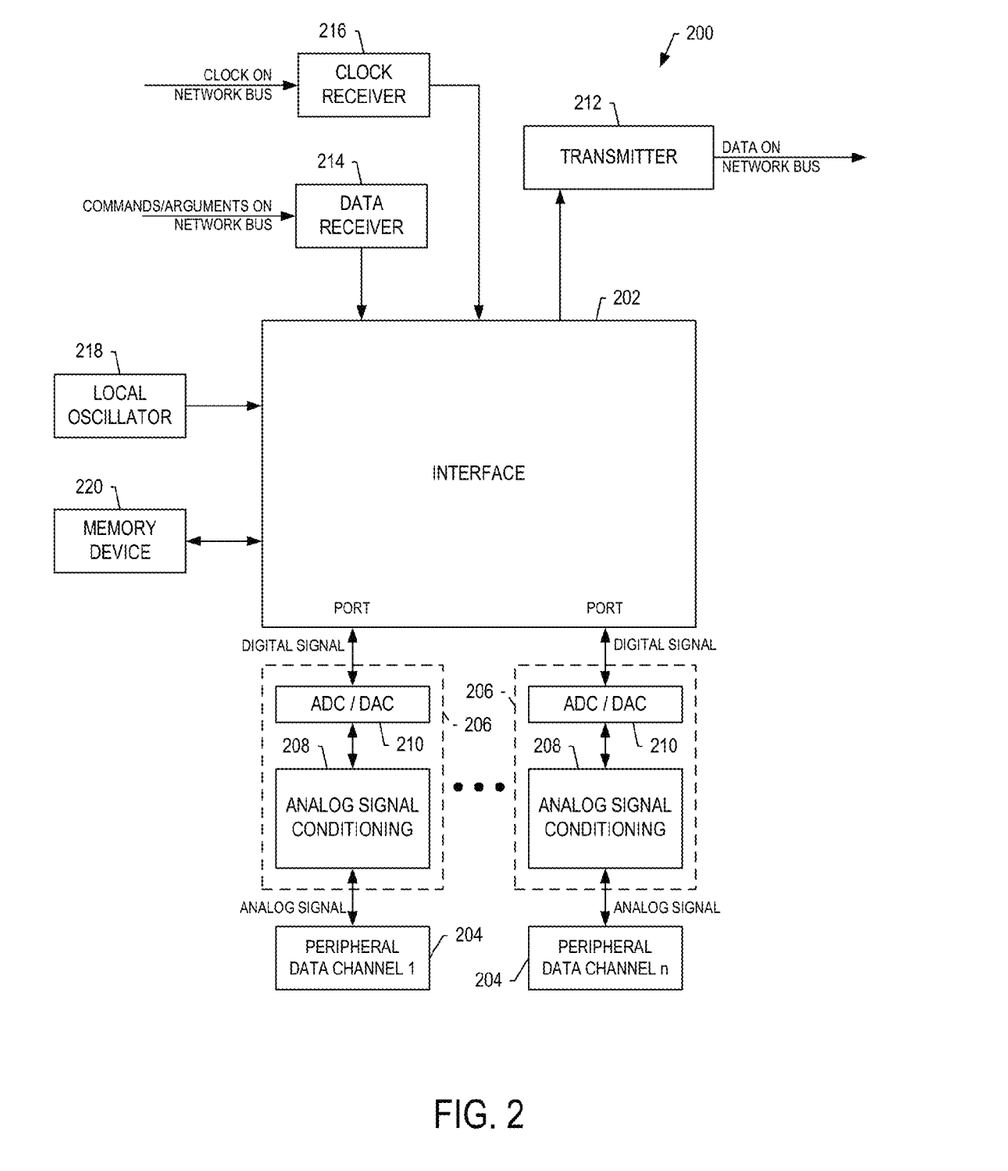
FIG. 2 illustrates a generalized block diagram of a remote device that in various example implementations of the present disclosure may correspond to a remote device illustrated in FIG. 1.

FIG. 2 illustrates a generalized block diagram of a remote device 200 that in various example implementations of the present disclosure may correspond to a remote device 106 illustrated in FIG. 1. As shown, the remote device may include a device interface 202 (e.g., ASIC, FPGA) coupled to and defining data channels 204 for one or more peripherals. The device interface may include various components for performing functions according to example implementations of the present disclosure. For example, the device interface may include ports such as serial or parallel ports that may connect the device interface to respective data channels, and that may be controlled by respective port control logic. The device interface may include various types of volatile memory at least some of which may be composed of one or more data registers, stacks of data registers or the like. The device interface may also include various other registers (e.g., stack-depth register, status register, device inventory register, configuration register, channel-service register, package-definition register), multiplexers (e.g., data-select multiplexer, output-data multiplexer), decoders (e.g., address decoder, command decoder), control logic or the like. Further details regarding a number of suitable components of the device interface may be found in the aforementioned '239 patent.

As shown, the device interface 202 may be coupled to the data channels 204 via respective circuitry 206. For each data channel, this circuitry may include a signal conditioning device 208, such as one or more amplifiers, filters, attenuators or the like, configured to condition analog signals to/from the peripherals. The circuitry may also include an appropriate analog-to-digital converter (ADC) and/or digital-to-analog converter (DAC) 210. In one example, an ADC may be connected between the device interface 202 and a sensor, and may be configured to convert analog signals from the sensor channel into digital data for input to the device interface. Similarly, for example, a DAC may be connected between the device interface and an actuator, and may be configured to convert digital signals from the device interface into analog signals for input to the actuator channel. It is possible that some sensors or actuators could produce or accept digital signals directly so that the circuitry may not require an ADC or DAC.

The device interface 202 may be connected to a network bus such as the network bus 104 of FIG. 1, and may be so connected to enable communication with a bus controller such as the bus controller 102 of FIG. 1. In this regard, the remote device may include a transmitter 212 configured to transmit data to the bus controller, and/or a receiver 214 configured to receive commands and data from the bus controller. The remote device 200 may also include a second receiver 216 configured to receive an optional synchronous clock signal from the bus controller in instances in which the network is operated in a synchronous mode. Likewise, the remote device may include a local oscillator 218, which may support operation of the network in the synchronous mode or an asynchronous mode. Even further, the remote device may include non-volatile memory 220. Although shown as being coupled to the device interface, different implementations of the device interface may instead integrate one or more receivers, transmitters, local oscillator, memory devices or the like.

Figure 3:
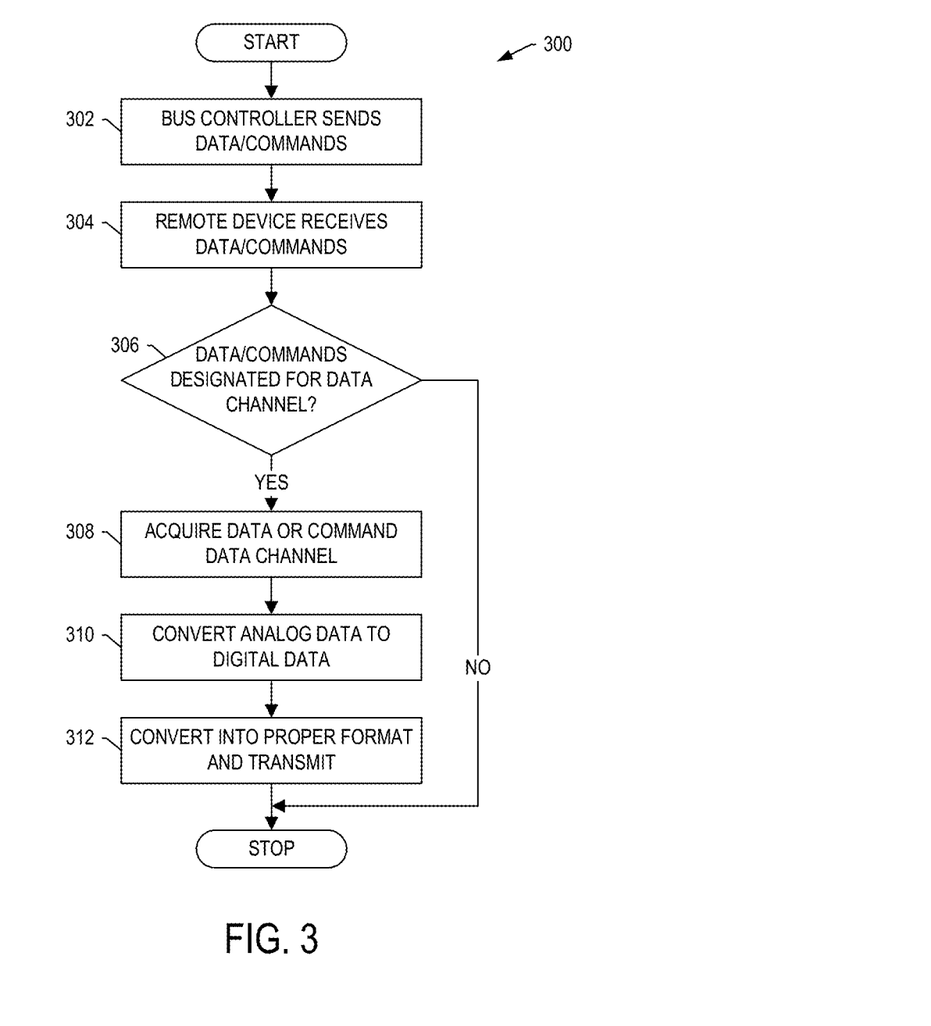
FIG. 3 illustrates various operations in a method according to one example implementation in which remote devices may include or be otherwise coupled to peripherals such as sensors and/or actuators.

FIG. 3 illustrates various operations in a method 300 according to one example implementation in which remote devices 106 (e.g., remote device 200) may include or be otherwise coupled to peripherals such as sensors and/or actuators. As shown in block 302, the method may include the bus controller 102 digitally sending commands and data across the network bus 104 to the remote devices, where the command and data may be designated for one or more data channels on the remote devices. The commands and data may be transmitted across the network using a data protocol, and the remote devices may receive and interpret the data and commands using the structure of the data protocol, as shown in block 304.

In one example, a command word may be reflected in a message that may include a sync portion, message body and parity bit. The message body may include an address field for addressing the command, and an operation code (opcode) field for specifying a command or operation to be performed. Structurally, in one example, the message may include a plurality of bits each of which has a value defined by the transition between first and second states, such as a binary "0" defined by a low-to-high transition, and a binary "1" defined by a high-to-low transition. The remote devices 106 may determine whether the commands and data are designated for any of their data channels, as shown in block 306; and if so, the respective remote device may either acquire data from the designated data channel (if a sensor), or command the data channel to perform a conversion (if an actuator), as shown in block 308. Analog data retrieved from the sensor channels may be converted into digital data, and may then be converted into the proper format according to the data protocol, as shown in block 310. And any appropriate digital data may be transmitted to the controller, as shown in block 312.

Figure 4:
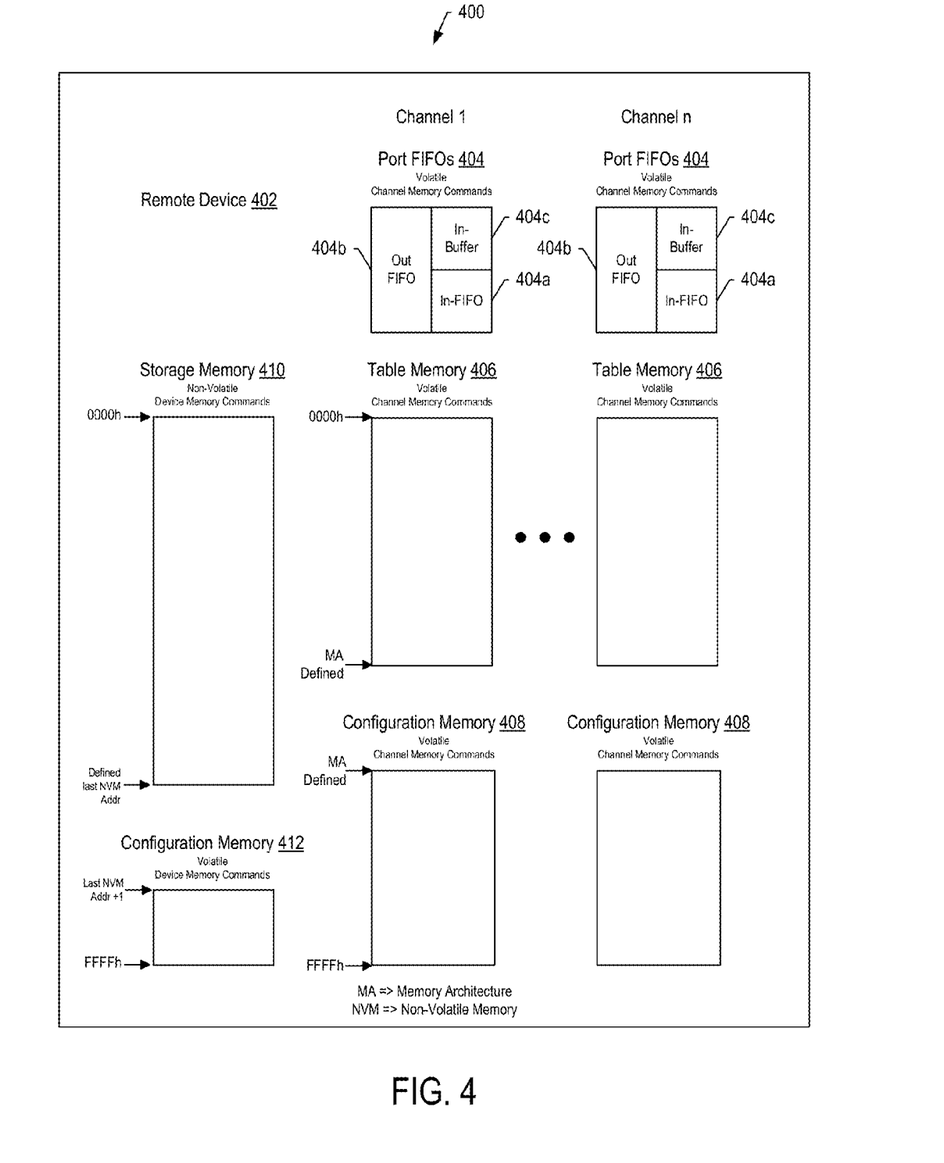
FIG. 4 illustrates the memory architecture of a remote device according to example implementations of the present disclosure.

As suggested in FIG. 2, a remote device 106 may include various types of volatile and non-volatile memory. FIG. 4 illustrates the memory architecture 400 of a remote device 402, which in various examples may correspond to the remote device 200 of FIG. 2. Generally, the remote device may include channel-based memory and device-based memory.

As shown in FIG. 4, for example, the remote device 402 may include channel-based memory such as one or more types of volatile memory for each channel. This channel-based memory may include, for example, first-in-first-out (FIFO) memory 404, and/or random access memory (RAM) such as table memory 406, configuration memory 408 or the like. The remote device may also include device-based memory such as a non-volatile device storage memory 410, and may optionally further include volatile RAM such as device-configuration memory 412. In one example, the volatile memory may be implemented in data register(s) or stack(s) of data registers by the device interface 202, and the non-volatile device storage memory may correspond to non-volatile memory 218.

The FIFO memory 404 may be accessible first-in-first-out whereby the first value placed in the respective memory may be the first value retrieved from it. The table memory 406 and configuration memory 408 of a channel may be accessible using the respective channel's logical address, and in the illustrated example may start at 0000h for each channel. And device storage memory 410 and device-configuration memory 412 may be accessible using any channel address within the remote device 402, and similar to the addressable channel-based table memory and configuration memory, the addressable device-based memory may start at 0000h. That is, more generally, the addressable channel-based memory may start at an address having the same value for each channel, and having the same value as the address at which the addressable device-based memory may start.

Briefly, the FIFO memory 404 and table memory 406 may be used for various purposes such as data acquisition buffering for real-time data streaming ("real-time" defined herein as including "near-real-time"). The FIFO memory may also be used for configuration. The device storage memory 410 may be intended for information storage. The device-configuration memory 412 and configuration memory 408 may be intended for volatile device and channel setup within the remote device 402, and may be populated or otherwise loaded from the device storage memory. In various example implementations, then, the device storage memory and most configuration memory are not intended to be used in real-time data acquisition and control modes.

The FIFO memory 404 may permit the streaming of data to or from a peripheral, and in various examples, may provide a "staging area" between a peripheral data acquisition or control channel and the network bus (e.g., bus 104). Each FIFO memory may include an in-FIFO 404a and out-FIFO 404b, and may further include an in-buffer 404c. The in-FIFO may buffer data between the peripheral and the network bus, while the out-FIFO may buffer data between the network bus and the peripheral. In various examples, either or both of the in-FIFO or out-FIFO may be dual-ported such that data may be read out of or received into the respective FIFO while data is transferred from or to a respective peripheral. Also, in various examples, either or both of the in-FIFO or out-FIFO may be configurable to operate in a direct mode or in a buffered mode.

In the direct mode, the in-FIFO 404a may obtain data directly from the peripheral. In one example, data may be received into the in-buffer 404c and pass directly through to the in-FIFO ready to be retrieved through an appropriate command. The out-FIFO 404b in the direct mode may accept data from the bus and immediately transfer it to the peripheral. In the buffered mode, the in-FIFO 404a and in-buffer 404c may act separately. Data received from the peripheral may be brought into the in-buffer and stored there. Data may then move from the in-buffer to the in-FIFO on an appropriate command. The out-FIFO in the buffered mode may store data from the bus and on command move data out of the out-FIFO to the peripheral.

Similar to the FIFO memory 404, individual channels may be equipped with table memory 406 that contain information that is stored in an addressable manner. This memory is volatile in nature and can be used in applications where values at multiple logical addresses may change dynamically. In various examples, this table memory may be referred to as a current value table (CVT). This data may be updated synchronously or asynchronously. Messages stored within the table memory may span one or more address locations where, in one example, each location may include a 16-bit-wide word. In one example, the table-memory addressing and message size may be defined by the device manufacturer.

The device storage memory 410 may be used by the remote device 402 to store data such as the UUID, protocol version, number of data channels, logical addresses, group masks, device and/or channel configuration information, device storage memory pointers, peripheral boot information, manufacturer-defined device and channel information, and any other data that a manufacturer or user may define. Even further, for example, device storage memory may also be used to store user-defined information such as remote device installation location, calibration data or the like. In various examples, at least a portion of this data may form an electronic data sheet (EDS).

At power up or reset of the remote device 402, the remote device may perform a boot sequence, which may include a device-initialization phase and device and/or channel configuration-boot phase. During device initialization, data of the device storage memory 410 may be loaded into volatile memory (e.g., table memory 406, configuration memory 408, device-configuration memory 412) or other register space so that it may be accessed in real time or near-real time. In one example, this may include reading from the device storage memory items such as the UUID, implemented mask, logical and group addresses, device storage memory pointers and the like. The boot phase, then, may be the process of configuring the device, channels and respective peripherals for operation.

In accordance with example implementations, the protocol of the network system may include different, distinct sets of commands for the channel-based memory and device-based memory. In one example, the protocol may include a set of channel commands for accessing the channel-based memory of the remote device 402, and a different, distinct set of device-memory commands for accessing the device-based memory of the remote device.

The channel commands may include various FIFO and distinct channel-memory commands through which the FIFO memory 404, table memory 406 and/or configuration memory 408 may be accessible. The channel commands include time-base commands for approximately line-speed movement of data between each channel and its respective channel-based memory. These commands may include, for example, commands designed to get data from sensor ports and provide data to actuator ports, and/or commands designed to provide efficient and "instantaneous" configuration setup of signal conditioners (e.g., signal conditioners 208).

The device-memory commands may include commands through which the device storage memory 410 and device-configuration memory 412 may be accessible. These commands may be intended to provide access to generally static information, operation information, configuration, calibration and catalog information, and/or mapped memory access for future applications where microprocessor memory may be shadowed for access.

Further information regarding various channel commands and device-memory commands will now be described below.

1. Example Channel Command Descriptions

One or more remote devices 402 may be equipped to perform time-deterministic actions for data acquisition or control applications and channel configuration. Such devices may use one of a number of time-base commands to move data into the in-FIFO 404a, out of the out-FIFO 404b, into or out of table memory 406, or into or out of channel configuration memory 408. Each addressable channel within a remote device may contain one or more of the different volatile memory options. Channel commands may be real-time in nature such that the execution time for each command and response may be well understood and may be predicted, defined or the like. The execution time for each channel command and response thereto may be more predictable than that for each device-memory command, which may thereby lead to different timing requirements of the respective commands.

The channel commands may include channel FIFO commands for moving real-time, continuously-acquired data, such as from an ADC or DAC (e.g., ADC/DAC 210) through in-FIFO memory 404a or out-FIFO memory 404b, respectively. These FIFO commands may offer transfer of single data words and/or explicitly defined blocks of data words. The FIFO commands may also permit a remote device 402 to be preconfigured within non-volatile device storage memory 410 that may pre-define a data transfer size using packages. The use of such a package command may eliminate the block size word within read and write commands. The package size may implicitly define the data block size to be moved from in-FIFOs and out-FIFOs.

The channel commands may also include channel-memory commands for moving real-time, continuously-acquired data through table memory 406, or caching configuration information for each channel in suitable configuration memory 408. In this regard, the table memory may be used to hold incoming (data acquisition) or outgoing (control) data in addressable memory space that may be used to move real-time continuously acquired data stored in volatile addressable memory locations.

The configuration memory 408 may be used to immediately program user-configurable attributes of the channel. Changing the values of this memory may be temporary and volatile. The device storage memory 410 may not store configuration settings in the volatile channel memory. But in various examples, any changes in volatile channel memory may need to be made in the equivalent space in the device storage memory, such as in instances in which the settings may be desired after power cycling or reset of the remote device 402. In instances in which channel configuration values are stored in the device storage memory, and a channel boot schedule exists, on power up or reset, the remote device may load the channel configuration memory and configure the channels with values stored within the non-volatile device storage memory. Conversely, in instances in which channel configuration values are not saved in the device storage memory, they may be replaced with values stored in the device storage memory when the remote device is reset or when power is cycled.

1.1. Trigger

A trigger command may be used to precisely latch data in or out of a remote device 402 using a transition within the trigger command word. This feature may be used to establish the global time base.

A remote device channel configured as sensor may utilize the in-FIFO 404a. In one example, conversion signal may be immediately generated when a trigger command is received, which may cause the peripheral to begin a sample conversion. When the sample is generated by the peripheral, the in-FIFO may acquire a preprogrammed amount of data.

A remote device channel configured as an actuator may utilize the out-FIFO 404b. In one example, a conversion signal may be immediately generated when a trigger command is received, which may cause an output component to the peripheral (e.g., DAC 210) to update its output. The out-FIFO may then send out a preprogrammed amount of data. For triggering operations, the out-FIFO may always be in buffered mode (direct mode may move data out to the peripheral such as an actuator as soon as it is received).

1.2. Synchronize

A synchronize command may be used to precisely synchronize remote devices 402 in addition to performing a trigger operation similar to that described above. This command may simultaneously produce a synchronize signal and a trigger signal.

In one example, the synchronize command may be an isochronous operation in which a synchronize-and-trigger event may be generated on the changing center edge of a parity bit in the synchronize command message. In addition to producing the synchronize signal, the synchronize command may have the same or similar timing and behavior within the remote device 402 as the aforementioned trigger command. In one example, a response to the synchronize command with a trigger signal may be mandatory, but depending on the application, the provision or use of a synchronize signal may be optional.

1.3. Get Channel Status

A get-channel-status command may be directed at a single channel through a channel to retrieve the status of the channel. In one example, the status may be reflected in a multi-bit status register (e.g., in device interface 202), and the get-channel-status command may be directed to retrieve the contents of the status register. The contents of the status register may include a plurality of bits some of which may be latched while others may not be latched. In one example, the latched bits may be cleared when the status word is read by this command.

The response to the get-channel-status command may reflect the status of any of a number of different components or operational capabilities of the remote device 402. In the case of a multi-bit status register, for example, each bit may indicate a particular status when set. The register may include bits indicating an error while attempting to access the in-FIFO 404a, out-FIFO 404b or table memory 406, and/or while attempting to write to the respective memory.

The status register may include other bits indicating errors or other notifications regarding the transfer of data into or out of the FIFOs 404a, 404b, such as the premature clearance of an in-FIFO, the absence of requested peripheral data for transfer to the in-FIFO, the interruption or halt to a requested channel-transfer operation, or the like. The register may include a bit representing a master fault flag for the channel, and/or bits indicating an internal logic condition, busy condition or the like. The register may include bits tied to respective external peripheral devices and that indicate the status of the respective devices. The register may include bits indicating a channel in test mode, or indicating the occurrence of an error in a channel built-in-test (BIT). In even further example in which the channel may be enabled to carry out a macro process, the register may include a bit indicating that the process is enabled.

1.4. Set Channel Service

A set-channel-service command may be used to perform output type discrete service and opcode operations, such as through each channel's channel-service register (e.g., in device interface 202). In various examples, the set-channel-service command may include a portion (e.g., least-significant—LS—byte) for indicating opcode operations, and another portion (e.g., most-significant—MS—byte) for indicating service operations.

The channel-service opcodes may temporarily set the remote device 402 to a test mode, such as BIT or another test mode. The channel-service opcodes may override another operational mode of the remote device until it is generally reset or reset to its normal operational mode (e.g., through another opcode), or power is cycled. Some of these test modes may not apply to all devices. If the channel does not support an opcode, it may be ignored.

The portion of the set-channel-service command for indicating service operations may include a channel-service reset bit field that may be used to reset volatile memory and/or various registers within the channel. In one example, the field may be a multi-bit field each bit of which may be set to select memory to reset or otherwise clear. The field may include bits to clear a channel's in-FIFO 404a and/or out-FIFO 404b, and in various examples may also clear any other buffers associated with respective input and/or output ports. The field may also include a bit to clear a channel's table memory 406, such as by clearing to 0000h the contents of the selected memory, and which in various examples may also clear any accumulators or reset any timers. This may reset only the selected memory, and may not affect the contents of the configuration memory 408. The remote device 402 may be ready to accept new commands immediately after receiving this command. Some selections may not be supported. If the channel does not support a bit selection, it may be ignored.

1.5. Get In-FIFO/Out-FIFO Count

A get-in-FIFO-count command may be used to determine the number of words contained in the in-FIFO 404a in buffered mode, or the in-buffer 404c and in-FIFO in direct mode. Similarly, a get-out-FIFO-count command may be used to determine the number of words contained in the out-FIFO 404b. The commands may cause the remote device 402 to return a multi-bit value representing the number of words contained in respective ones of the in-FIFO or out-FIFO.

1.6. Peripheral to/from FIFO Transfer

A FIFO-transfer command may be used to move data from the out-FIFO 404b to a remote device's peripheral, and/or from the peripheral to the in-buffer 404c. The command may include respective arguments specifying a number of bytes to be transferred from the out-FIFO to the peripheral, and/or the number of bytes to be transferred from the peripheral to the in-buffer. Either of the arguments, though, may be zero. In various examples, although the command may specify a number of bytes, data may be transferred in word boundaries. For example, when there are an odd number of bytes, the last word sent from the out-FIFO or received to the in-buffer 404c may contain a valid lower byte and invalid upper byte.

The remote device 402 receiving this command may respond in a number of different manners for a number of different conditions. For example, for a transfer from the out-FIFO 404b, the remote device may transfer the specified number of bytes as long as there are words in the out-FIFO to transfer. If the out-FIFO exhausts its contents before the defined transfer is complete, the command may abort. If the in-buffer argument is greater than the number of bytes that the in-FIFO 404a may be capable of producing in a single request, then the max number of bytes the FIFO can produce may be transferred to the in-buffer 404c and the remaining request may be ignored. This may avoid a fault and ensure that only intentional data is output to the peripheral.

The in-FIFO 404a may operate in the direct mode when the in-buffer argument is greater than zero, and the out-FIFO 404b may be set to the buffer mode when the out-FIFO argument is greater than zero. In either instance, the direct/buffer mode operation may occur regardless of the channel's setting, although it may be temporary if different from the channel's configured-setting.

When the out-FIFO argument is greater than the in-buffer argument, the in-buffer contents may be received starting after the difference between the arguments. When the out-FIFO argument is less than or equal to the in-buffer argument, on the other hand, the transfers may begin at the same time. The FIFO 404 may insert a predefined value if output data is still required beyond that specified, such as for a full-duplex FIFO.

1.7. Read In-FIFO Word/Block/Package

These read-in-FIFO commands may be used to read a data word, block of words or predefined package of a number of words from a remote device 402 channel's in-FIFO 404a, and transmit the word(s) onto the bus (e.g., bus 104). In one example, the number of data words may be specified in the command. And in one example in the context of a package of words, the number of data words in a package may be predefined within a package-definition register of the remote device (e.g., in device interface 202).

1.8. Write Out-FIFO Word/Block/Package

These write-out-FIFO commands may be used to receive a data word, block of words or predefined package of words from the bus (e.g., bus 104), and write the word(s) to the out-FIFO 404b. Similar to the read command, in one example, the number of data words may be specified in the command. Likewise, for example, the number of data words in a package may be predefined within the package-definition register of the remote device.

1.9. Write Out-FIFO Word/Block/Package while Acquire

These write-out-FIFO-while-acquire commands may be used to receive a data word, block of words or predefined package of words from the bus (e.g., bus 104), and write the word(s) to the out-FIFO 404b. The out-FIFO may then send the data directly to the peripheral while acquiring one data word immediately into the in-FIFO 404a from the peripheral. Similar to before, in one example, the number of data words may be specified in the command or, for a package, may be predefined within the package-definition register. The in-FIFO and out-FIFO may be set to either direct or buffered mode. But these commands may be intended for use when the out-FIFO is set to direct mode. In one example, then, the remote device 402 may treat the command as a write-out-FIFO command if it receives the command while the out-FIFO is in buffered mode.

1.10. Read/Write Channel Memory Block

These commands may be used to read or write a block of data words from or to a device's channel memory. The commands may include an argument indicating a memory location pointer value, and the read/write operation may start at the position in channel memory indicated by the respective argument. The commands may include an additional data argument that may tell the remote device 402 how many data words are to be read from its memory and transmitted on the bus (e.g., bus 104), or how many data words are to be received from the bus and written into its memory. The remote device may read/write the data starting at the passed pointer value, and sequentially read/write the incrementing addresses.

2. Example Device-Memory Command Descriptions

In addition to channel commands, the protocol may include device-memory commands. These commands may include commands for addressing device-based memory used to configure the remote device 402. As indicated above, in various examples, this memory space may not be intended for real-time data acquisition operations.

The device-memory commands generally address non-volatile device storage memory 410 used for storage of configuration and control information for both an initialization process and run-time operations, but may also address volatile device-configuration memory 412. As suggested above, the device storage memory may include user-provided information and manufacturer-stored information. User-provided information may include, for example, information specific to the application of the remote device at a device and channel level, and may include channel parameter information, calibration coefficients and the like. The manufacturer-stored information may include, for example, boot routines, device-specific adjustment coefficients, other user-unchangeable information and the like. In various examples, space within the device storage memory may be reserved for non-volatile storage of the volatile device and channel configuration memory.

The ability to successfully read and write to memory locations may be dependent on the hardware implementation of the remote device 402. In various examples, manufacturer's memory-access time through a device interface (e.g., in device interface 202), which may be necessary for both reading from and writing to non-volatile memory, may be specified.

2.1. Set/Get Device Memory Pointer

These device-memory-pointer commands may set or read a multi-bit device memory address pointer within a remote device 402. For a set command, one or more remote devices may respond to this command by setting their respective device memory address pointers to the value contained in the command argument; and in various examples, it may be intended to augment page-type memory where a cache may be used to reduce read cycle times in the device storage memory 410. For a get (read) command, the remote device may respond with the current location of its device memory address pointer.

2.2. Read/Write Device Memory Block

These commands may be used to read or write a block of data words from or to device storage memory 410. The commands may include an argument indicating a memory location pointer value, and the read/write operation may start at the position in device storage memory indicated by the respective argument. The commands may include an additional data argument that may tell the remote device 402 how many data words are to be read from its device storage memory and transmitted on the bus (e.g., bus 104), or how many data words are to be received from the bus and written into its device storage memory. The remote device may read/write the data starting at the passed pointer value, and sequentially read/write the incrementing addresses.

2.3. Set Memory Protection Mode

This command may be used to unlock or lock sections of device storage memory 410. The command may include an argument including an appropriate unlock code.

As explained above, at power up or reset of the remote device 402, it may perform a boot sequence including a device-initialization phase and device and/or channel configuration-boot phase. During device initialization, data of the device storage memory 410 may be loaded into volatile memory (e.g., table memory 406, configuration memory 408, device-configuration memory 412) or other register space so that it may be accessed in real time or near-real time; and during the boot phase, the device, channels and respective peripherals may be configured for operation. In this regard, the device storage memory may store boot code and configuration data used to configure a remote device.

Figure 5:
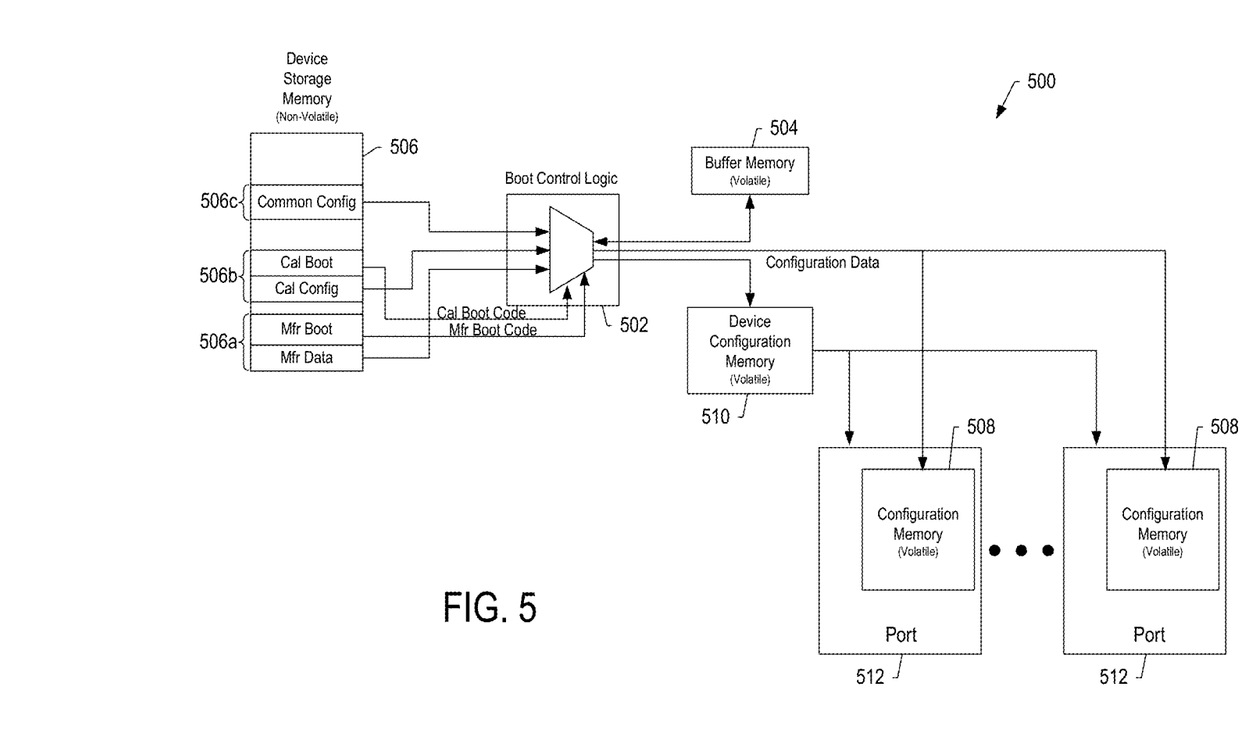
FIG. 5 illustrates a schematic block diagram of a remote device executing a boot sequence according to one example implementation of the present disclosure.

FIG. 5 illustrates a schematic block diagram of a remote device 500 executing a boot sequence according to one example implementation of the present disclosure. In some examples, the remote device 500 may correspond to the remote device 402 of FIG. 4, which may in turn correspond to the remote device 200 of FIG. 2. As shown, the remote device may include boot control logic 502 and a temporary volatile (e.g., FIFO-style) buffer memory 504 (both, e.g., in device interface 202) configured to carry out or otherwise execute the boot sequence. The remote device may include device storage memory 506 (e.g., device storage memory 410), which may in turn include three general types for use in the boot sequence, namely manufacturer memory 506a, calibration memory 506b and user memory 506c (sometimes referred to as common configuration memory). The manufacturer memory may include remote device function data, manufacturer boot code with various peripheral settings, and/or manufacturer EDS. The calibration memory may include optional calibration boot code and calibration EDS. And user memory may include common configuration data that may be changeable by the end-user such as channel addresses, trigger group addresses, device and channel settings, and user-based EDSs.

In one example, each of the manufacturer memory 506a, calibration memory 506b and user memory 506c may be a respective contiguous memory block within the device storage memory 506. Even further, for example, the boot code may be stored in a contiguous memory sub-block within the memory block of a respective type of memory. Thus, for example, the manufacturer boot code may be stored in a contiguous memory sub-block within the manufacturer memory. Similarly, for example, the calibration boot code may be stored in a contiguous memory sub-block within the calibration memory. In various instances, each memory sub-block may itself constitute a memory block in that each represents a set of memory addresses without a gap, discontinuity or padding between them.

To execute a boot sequence, the boot control logic 502 may pull boot data from the manufacturer memory 506a, calibration memory 506b, user memory 506c and perhaps other, extended memory of the device storage memory 506. The boot control logic may then place it into appropriate configuration memory 508 (e.g., configuration memory 408) and/or device-configuration memory 510 (e.g., device-configuration memory 412) for channel ports of the remote device 500. For example, the boot control logic may populate appropriate configuration memory and/or device-configuration memory by executing boot code (manufacturer and possibly calibration) in the device storage memory, which may draw data from other portions of the device storage memory. Each channel port (by respective port control logic) may pull the data from the appropriate configuration memory to configure itself.

The device storage and configuration memories 506, 508, 510 may be accessible using the appropriate channel and device-memory commands. In one example, memory writes to the configuration memories may be detected by the channel ports 512, which may cause the channel ports to act on the respective data and take on any new settings.

In one example, the boot code in device storage memory 506 may include one or more device and/or channel boot "sets" that include schedules, which may be sequentially executed using appropriate commands and, if desired, an added delay. A boot set may include data that may be used to configure the remote device 500 and/or channel characteristics or peripherals attached to the remote device. Each boot set may include one or more configuration routines for the device or one or more channels.

In various examples, there are no restrictions as to the number or execution order of boot sets. In these examples, channels may boot out of order (although it may be easier to follow if the device boot is first, followed by increasing channel order), the device boot set may occur at any point during the boot routine, and any channel or the device may have multiple boot sets. In various examples, then, the boot code may include a boot sequence with a plurality of sequential boot sets for respective channels, with the boot sets being out of order relative to an order of the respective channels. The boot sequence may include more than one boot set for at least one channel, and/or any boot set may be for multiple channels.

In instances of a boot sequence including more than one boot set for a channel, a channel's boot code that occurs more than once may be different from the previous set. This may imply the capability of creating an initialization sequence where different channels may perform a relatively-sophisticated sequence of events involving multiple channels. One suitable example is in the case of sensor or actuator channels that may use the information gathered from a previous channel boot to feed another channel's actuation.

The buffer memory 504 may include a number of sequential registers (e.g., 16-bit word registers) that may be used as a "scratch pad" to temporarily store values. Using this temporary memory, the boot control logic 502 may move stored values between different locations of addressable memory including the device storage and configuration memories 506, 508, 510, as well as table memory (e.g., table memory 406). For boot configuration using stored attributes, this may include transfers between non-volatile device storage memory and volatile configuration memory and/or device-configuration memory. However, boot sets may also be created to move data between channels by moving data into available (and, e.g., unused) volatile remote device memory spaces, ending a channel boot set, and then retrieving the data in a future boot set.

Figure 6:
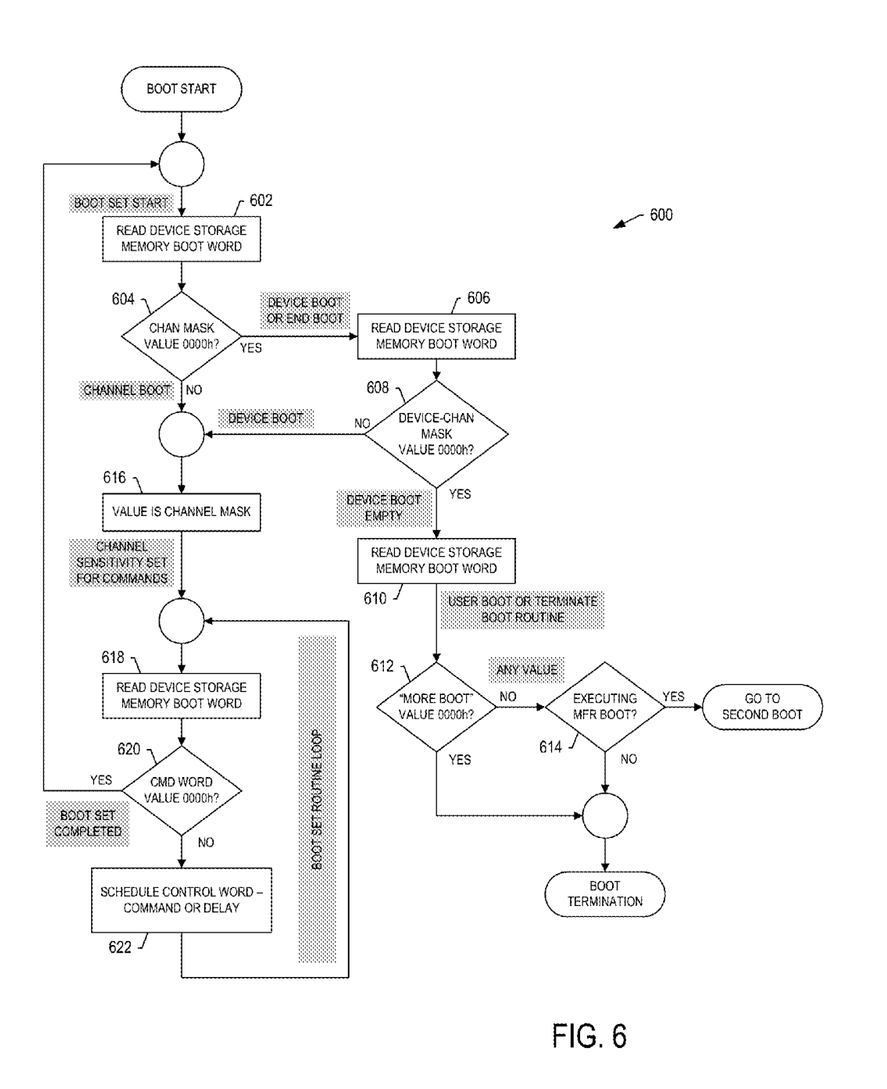
FIG. 6 illustrates various operations in a method of executing a boot sequence according to one example implementation.

FIG. 6 illustrates various operations in a method 600 of executing a boot sequence according to one example implementation. Execution of the boot sequence may include execution of one or more boot sets (device and/or channel) each of which may include reading and interpreting a sequence of words from the boot code in the device storage memory 506. The first of these boot words in each boot set may include a predefined word (e.g., 0000h) indicating a boot set for the device, or a boot channel mask indicating a boot set for one or more channels (see blocks 602, 604). The channel mask may specify the channel number(s) for which the boot data is intended, and which may be a bit vector with each bit in the vector representing a respective channel. Each bit set in the channel mask may represent an addressable channel that may simultaneously receive the data contained in the channel boot set.

In various examples, a boot set may end with a predefined word such as 0000h. In one example, a boot set for the device or channel may be launched with 0000h or channel mask, and once launched, the boot set for that device/channel may end with 0000h. If no boot is desired, the boot code may include two sequential words containing 0000h.

In various examples, the device may have more than one boot set, and in these examples, the end of a boot set may be followed by 0000h to indicate another device boot set. As indicated above, in one example, a boot set starting with 0000h may indicate that the boot set is intended for device configuration as opposed to channel configuration (see blocks 606, 608). But if no boot is present in the device, a 0000h word at the beginning of boot set may be followed by another 0000h word, which may be read and interpreted as a boot terminate for a respective boot code (manufacturer or calibration). To completely leave the boot sequence, another 0000h word (to end completely) or any non-zero word may follow (see blocks 610, 612, 614). Another 0000h word may completely leave the boot sequence, and any non-zero word may start the next boot code. A boot sequence may therefore end with three instances of 0000h. The first may indicate the end of the last boot set, the second may indicate that a device boot may be starting, and the third may indicate that this device boot set is an empty set, thus ending boot.

As indicated above, manufacturer boot code may be stored in a contiguous memory sub-block within manufacturer memory 506a, and calibration boot code may be stored in a contiguous memory sub-block within calibration memory 506b. In one example, then, the manufacturer boot code may be executed, after which the calibration boot code may be executed (e.g., provided the manufacturer enables the calibration memory). In this example, two sequential 0000h words may exit the manufacturer boot sequence, and three sequential 0000h words may terminate.

In the case of a channel boot, the channel mask may be considered a channel sensitivity list that indicates the beginning of a channel boot for a particular channel (see block 616). As suggested above, each bit in the mask may indicate a channel boot of a particular channel such that more than one channel may be selected using the mask, thereby enabling a boot set for more than one channel at the same time.

A boot set include a routine loop to initialize the remote device 500, the channel or a peripheral connected thereto (see blocks 618, 620, 622). This routine may define a schedule that has commands and data along with timing commands that may provide configuration data with proper timing through the channel to the peripheral during the boot sequence. The schedule may be directed to all channels specified in the channel mask, and may therefore support group command-like operations. In various examples, the schedule may include one or more schedule control words such as command or delay words, and may include any data words that may be associated with a command.

In one example, a command or delay word may be delineated by the MS bit of a boot word (e.g., MS bit '0' to indicate a command, and MS bit '1' to indicate a delay word). The command word may include an appropriate opcode specifying a command or operation to be performed, and a number of data words required to complete the command. The delay word may include a delay value specifying a number of cycles to delay before execution of the next word sequentially in the boot set, such as in 100 nanosecond (nS) increments. And as suggested above, the command word may be followed by one or more associated data words, such as arguments for use with the command, a delay word that may specify a delay to allow time that may be required to execute the command, or the like.

The following table illustrates a basic outline for an example boot sequence for a device/channel boot.

| Memory Address (hex) | | Words | Channel Boot Set | Word Function |
|---|---|---|---|---|
| | Start of Boot Routine Start Boot Set Y1 | | | |
| Y1 | Boot Channel Mask for boot set 1 | 1 | C1 | Channel sensitivity list for boot set |
| Y1 + 1 → | Schedule Control Words/Data Words | w1 | C1 | Schedule execution loop |
| Y1 + w1 + 1 | | | | |
| Y1 + w1 + 2 | 0000 | 1 | | Boot set Y1 termination |
| | Start of Boot Set Y2 | | | |
| Y2 | Boot Channel Mask for boot set 2 | 1 | C2 | Channel sensitivity list for boot set |
| Y2 + 1 → | Schedule Control Words/Data Words | w2 | C1 | Schedule execution loop |
| Y2 + w2 + 1 | | | | |
| Y2 + w2 + 2 | 0000 | 1 | | Boot set Y2 termination |
| Y3 | 0000 | 1 | D1 | Device boot set indicator? |
| | Start of Boot Set Y4 (Device) | | | |
| Y4 | Boot Channel Mask for Device Boot | 1 | D1 | Channel sensitivity list for boot set |

-continued

| Memory Address (hex) | | Words | Channel Boot Set | Word Function |
|---|---|---|---|---|
| Y4 + 1 → | Schedule Control Words/Data Words | w4 | D1 | Schedule execution loop |
| Y4 + w4 + 1 | | | | |
| Y4 + w4 + 2 | 0000 | 1 | | Boot set Y3 termination |
| | Other Boot Sets follow . . . | | | |
| : | (represents n number of boot sets) | w5 | | |
| : | Start of Boot Set Y6 (last boot set) | | | |
| Y6 | Boot Channel Mask for boot set n + 3 | 1 | n + 3 | Channel sensitivity list for boot set |
| Y6 + 1 → | Schedule Control Words/Data Words | w6 | n + 3 | Schedule execution loop |
| Y6 + w6 + 1 | | | | |
| Y6 + w6 + 2 | 0000 | 1 | n + 3 | Boot set Y6 termination |
| Y6 + w6 + 3 | 0000 | 1 | — | Device boot set indicator? |
| | Start of Boot Set Y7 (but following it is empty) | | | |
| Y7 | 0000 | 1 | — | Device boot empty |
| Y7 + 1 | 0000 | 1 | — | Boot terminate |

In the preceding example, Y2=Y1+w1+3; Y3=Y2+w2+3; Y4=Y3+1; Y6=Y4+w4+2+w5+1 and Y7=Y6+w6+4. Cx represents a boot set for the channels represented in the boot channel mask, and Dx represents a boot set for the device.

Again, the boot control logic 502 may be coupled to a temporary volatile buffer memory 504 that can be used as a "scratch pad" to temporarily store values. Using this temporary memory, stored values may be moved from any memory location of the remote device 500 (e.g., from the non-volatile device storage memory 506) to other locations in memory such as those used for device or channel configuration.

In one example, within the boot set routine loop, commands such as the aforementioned read channel memory block (1.10) or read device memory block (2.2), and corresponding write channel memory block or write device memory block, may be consecutively-executed to move data into and out of the buffer scratch-pad memory 504. This special-case capability, which in various examples may be limited to only the boot code, may enable the boot control logic 502 to read data such as configuration values from a portion of the device-storage memory 506 outside the contiguous sub-block of memory storing a respective boot code, and write it to volatile memory (e.g., configuration memory 508, 510) for use by the remote device 500 for device and/or channel configuration. In one example, each command schedule control word may be followed with an appropriate delay schedule control word. When a read command is issued, then, a schedule "delay" may follow the command's arguments in the boot schedule to provide time for the boot control logic 502 to retrieve the data from memory and place it into the buffer memory 504. The schedule may next include an appropriate write command (specifying the same number of words to transfer) to either configuration memory 508 or device-configuration memory 510. Following the write command's arguments may be another schedule delay, which may allow time for the data to be retrieved from the buffer memory and sent to the appropriate volatile memory location. In one example, the write delay value may be increased beyond needed execution time to accommodate any channel execution time that may be required to complete a channel task.

Notably, data may be passed between two channels by leaving data in the buffer memory 504 between one boot set and another. For example, in a boot sequence including two or more boot sets, one boot set for a channel may end with a read memory block command in which data is placed into the buffer memory, and another boot set for another channel may begin with a write memory block command in which the data is transferred from the buffer memory to the other channel's configuration memory 508.

The following table illustrates an example read-write sequence that may utilize the buffer memory 504 in a boot sequence for a device/channel boot.

| Word Type | Command/Data Word | Description |
|---|---|---|
| Command in Schedule Control Word | Read Device Memory Block | Read command to read data from remote device Memory (typically NVM) |
| Data Word | [Memory Read Address Pointer] | Pointer to NVM Device Memory to read data from |
| Data Word | [Number of Data Words] | Number of Data Words to Read |
| Delay in Schedule Control Word | (X) | "Temporary Buffer" Read Delay in 100 nS increments |
| Command in Schedule Control Word | Write Device or Channel Memory Block | Write command to write data to volatile Device or Channel Memory |
| Data Word | [Memory Write Address] | Pointer to volatile Device or Channel Memory to write Data to |
| Data Word | [Number of Data Words] | Number of Data Words to Write (must match data words to read) |
| Delay in Schedule Control Word | (Y) | "Temporary Buffer" Write Delay in 100 nS increments |

According to example implementations of the present disclosure, the network system 100 including its host computer or bus controller 102, a network bus 104, and one or more remote devices 106 may carry out operations such as those illustrated in the accompanying figures by various means. These means may include hardware, alone or under direction of data, program instructions, program code, computer program code, computer-readable program code, executable computer-readable program code or the like (generally "computer programs," e.g., software, firmware, etc.). As explained above, in various examples, this hardware may include an ASIC, FPGA or the like executing computer programs stored in a non-transitory computer-readable storage medium such as FIFO memory 404, table memory 406, configuration memory 408, device storage memory 410 and/or device configuration memory 412.

More generally, according to example implementations, any suitable computer program(s) may be more generally loaded onto a computer or other programmable apparatus (e.g., ASIC, FPGA) from a computer-readable storage medium (e.g., FIFO memory 404, table memory 406, configuration memory 408, device storage memory 410, device configuration memory 412) to produce a particular machine, such that the particular machine becomes a means for implementing one or more functions specified herein. The computer program(s) may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which this disclosure pertains having the benefit of the teachings presented in the foregoing description and the associated drawings. For example, example implementations of the present disclosure set forth herein may be used in lieu of or in addition to other image processing techniques such as super-resolution, post-processing image enhancement or the like. Therefore, it is to be understood that the disclosure not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
   a device interface including one or more ports coupled to and defining respective one or more data channels for respective one or more peripherals, the device interface including boot control logic and a volatile buffer memory, and including a volatile configuration memory; and
   a non-volatile device storage memory coupled to the device interface and including a contiguous memory block configured to store boot code with a boot set including a configuration routine for the apparatus or a data channel,
   wherein the boot control logic is configured to execute boot code including the boot set at power up or reset of the apparatus, the boot set including a read of data from the non-volatile device storage memory to the buffer memory, and a write of the data from the buffer memory to configuration memory to initialize the apparatus or the port for the respective data channel, the data being read from a portion of the non-volatile device storage memory outside the contiguous memory block configured to store the boot code.

2. The apparatus of claim 1, wherein the configuration memory includes volatile configuration memory for each channel,
   wherein the boot set includes a configuration routine for a data channel, and
   wherein the boot set includes a read of data from the non-volatile device storage memory to the buffer memory, and a write of the data from the buffer memory to the configuration memory to initialize the port for the respective data channel.

3. The apparatus of claim 1, wherein the configuration memory includes volatile device-configuration memory for the apparatus,
   wherein the boot set includes a configuration routine for the apparatus, and
   wherein the boot set includes a read of data from the non-volatile device storage memory to the buffer memory, and a write of the data from the buffer memory to the device configuration memory to initialize the apparatus.

4. The apparatus of claim 1, wherein the boot set includes first and second boot sets including configuration routines for respective first and second data channels, the device interface including volatile configuration memory for each of the first and second data channels, and
   wherein the boot control logic is configured to execute boot code including the first and second boot sets at power up or reset of the apparatus, the first boot set including a read of data for the first data channel from the non-volatile device storage memory to the buffer memory, and the second boot set including a write of the data from the buffer memory to configuration memory for the second data channel.

5. The apparatus of claim 1, wherein the boot code includes a boot sequence with a plurality of sequential boot sets for respective channels, the boot sets being out of order relative to an order of the respective channels.

6. The apparatus of claim 1, wherein the boot code includes a boot sequence with a plurality of sequential boot sets for respective channels, and includes more than one boot set for at least one channel.

7. The apparatus of claim 1, wherein the boot set includes a configuration routine for a plurality of data channels, the device interface including volatile configuration memory for each data channel, and wherein the boot set includes a read of data from the non-volatile device storage memory to the buffer memory, and a write of the data from the buffer memory to configuration memory for each of the plurality of data channels to initialize the ports for the respective data channels.

8. The apparatus of claim 1, wherein the read and write are effectuated by consecutively-executed read and write commands in the boot set.

9. The apparatus of claim 8, wherein each of the read and write command words is followed by a respective delay word in the boot set, the delay word specifying a number of cycles to delay before execution of a next word sequentially in the boot set.

10. The apparatus of claim 8, wherein the volatile configuration memory includes channel-based memory for each channel, and the non-volatile device storage memory is device-based memory,
   wherein the read and write commands are from a communication protocol with which the apparatus is compatible, the communication protocol including different, distinct sets of commands for accessing respective ones of the channel-based memory and device-based memory, the sets of commands having different timing requirements, and
   wherein one of the sets of commands includes the read command, and the other of the sets of commands includes the write command.

11. A method comprising:
   executing boot code at power up or reset of an apparatus comprising:
   a device interface including one or more ports coupled to and defining respective one or more data channels for respective one or more peripherals, the device interface including boot control logic and a volatile buffer memory, and including a volatile configuration memory; and
   a non-volatile device storage memory coupled to the device interface and including a contiguous memory block configured to store the boot code with a boot set including a configuration routine for the apparatus or a data channel, wherein executing the boot code includes the boot set, and the boot set includes: reading data from the non-volatile device storage memory to the buffer memory; and writing the data from the buffer memory to configuration memory to initialize the apparatus or the port for the respective data channel, the data being read from a portion of the non-volatile device storage memory outside the contiguous memory block configured to store the boot code.

12. The method of claim 11, wherein the configuration memory includes volatile configuration memory for each channel,
   wherein the boot set includes a configuration routine for a data channel, and
   wherein reading data includes reading data from the non-volatile device storage memory to the buffer memory, and writing the data includes writing the data from the buffer memory to the configuration memory to initialize the port for the respective data channel.

13. The method of claim 11, wherein the configuration memory includes volatile device-configuration memory for the apparatus,
   wherein the boot set includes a configuration routine for the apparatus, and
   wherein reading data includes reading data from the non-volatile device storage memory to the buffer memory, and writing the data includes writing the data from the buffer memory to the device-configuration memory to initialize the apparatus.

14. The method of claim 11, wherein the boot set includes first and second boot sets including configuration routines for respective first and second data channels, the device interface including volatile configuration memory for each of the first and second data channels, and
   wherein executing the boot code includes the first and second boot sets, the first boot set including reading data for the first data channel from the non-volatile device storage memory to the buffer memory, and the second boot set including writing the data from the buffer memory to configuration memory to for the second data channel.

15. The method of claim 11, wherein the boot code includes a boot sequence with a plurality of sequential boot sets for respective channels, the boot sets being out of order relative to an order of the respective channels.

16. The method of claim 11, wherein the boot code includes a boot sequence with a plurality of sequential boot sets for respective channels, and includes more than one boot set for at least one channel.

17. The method of claim 11, wherein the boot set includes a configuration routine for a plurality of data channels, the device interface including volatile configuration memory for each data channel, and
   wherein the boot set includes reading data from the non-volatile device storage memory to the buffer memory, and writing the data from the buffer memory to configuration memory for each of the plurality of data channels to initialize the ports for the respective data channels.

18. The method of claim 11, wherein the reading and writing are effectuated by consecutively-executing read and write commands in the boot set.

19. The method of claim 18, wherein each of the read and write command words is followed by a respective delay word in the boot set, the delay word specifying a number of cycles to delay before executing a next word sequentially in the boot set.

20. The method of claim 18, wherein the volatile configuration memory includes channel-based memory for each channel, and the non-volatile device storage memory is device-based memory,
   wherein the read and write commands are from a communication protocol with which the apparatus is compatible, the communication protocol including different, distinct sets of commands for accessing respective ones of the channel-based memory and device-based memory, the sets of commands having different timing requirements, and
   wherein one of the sets of commands includes the read command, and the other of the sets of commands includes the write command.

* * * * *